(12) United States Patent
Barrus

(10) Patent No.: US 8,904,539 B2
(45) Date of Patent: Dec. 2, 2014

(54) LOCATION CONSTRAINTS FOR TEMPLATE ACCESS AND FORM ACTIVITIES

(71) Applicant: John W. Barrus, Menlo Park, CA (US)

(72) Inventor: John W. Barrus, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 13/789,471

(22) Filed: Mar. 7, 2013

(65) Prior Publication Data

US 2014/0259106 A1   Sep. 11, 2014

(51) Int. Cl.
   *G06F 11/00*   (2006.01)
   *G06F 12/14*   (2006.01)
   *G06F 12/16*   (2006.01)
   *H04W 12/08*   (2009.01)

(52) U.S. Cl.
   CPC ..................................... *H04W 12/08* (2013.01)
   USPC ............................................ 726/24; 380/278

(58) Field of Classification Search
   USPC ....................................................... 726/3, 24
   See application file for complete search history.

(56) References Cited

U.S. PATENT DOCUMENTS

| 6,370,629 | B1 | 4/2002 | Hastings et al. |
| 6,985,588 | B1 | 1/2006 | Glick et al. |
| 7,372,839 | B2 | 5/2008 | Relan et al. |
| 7,945,586 | B1 * | 5/2011 | Fang et al. ............... 707/785 |
| 2004/0267551 | A1 | 12/2004 | Yadav |
| 2006/0120526 | A1 * | 6/2006 | Boucher et al. ........... 380/247 |
| 2012/0224826 | A1 | 9/2012 | Caudle et al. |
| 2014/0026193 | A1 * | 1/2014 | Saxman et al. ............... 726/4 |

FOREIGN PATENT DOCUMENTS

| EP | 0807283 | 4/2006 |
| EP | 2225743 | 1/2012 |

OTHER PUBLICATIONS

Marco Gruteser;Mobile Systems, Applications, and Services; May, 2003; ACM; pp. 30-42.*
Wikipedia.com, Location-Based Service, (http://en.wikipedia.org./wiki/Location-based_service) dated 1996, printed Jul. 11, 2013,11 pages.
Discovery Communications, LLC, How Does Foursquare Work? (http://curiosity.discovery.com/question/how-does-foursquare-work) dated 2011, printed Jul. 11, 2013, 3 pages.

* cited by examiner

*Primary Examiner* — Mohammad W Reza
*Assistant Examiner* — Monjour Rahim
(74) *Attorney, Agent, or Firm* — Patent Law Works LLP

(57) ABSTRACT

A system and method for limiting access to one or more forms based on a location constraint is described. A form access module retrieves one or more forms on a portable computing device, determines a location of the portable computing device, determines whether the location of the portable computing device is within a region where form access is granted, granting access to the one or more forms responsive to the location of the portable computing device being within the region, receiving strokes from a first user in at least one field on the one or more forms and storing the one or more forms and the strokes received on the one or more forms.

20 Claims, 11 Drawing Sheets

300

PATIENT FOLLOW UP REPORT

303    PATIENT DETAILS    305    301

| Patient Name: | Patient ID: |
|---|---|
| Doctor Name: | Date: |

Follow Up Tests

| Blood Test | ECG | BP Test | Blood Sugar Level | Pupil Dilation Test |
|---|---|---|---|---|
| CBC:<br>Blood Chem: | | High:<br>Low: | | |

Final Report and Assessment

| Assessment of results | Recommended Treatment/Med. |
|---|---|
| | |

Physicians Statement

*I have completed the medical examination of (Mr./Mrs./Ms).................*
*to the best of my knowledge, I confirm that the above information is correct.*

| Name of Physician: |
|---|
| Hospital: 307 |
| Signature: |
| Date: |

Figure 3

400 ⟶ Location Constrained Field

PATIENT FOLLOW UP REPORT

PATIENT DETAILS

| Patient Name: | Patient ID: |
|---|---|
| Doctor Name: | Date: |

Follow Up Tests — 401

| Blood Test | ECG | BP Test | Blood Sugar Level | Pupil Dilation Test |
|---|---|---|---|---|
| CBC:<br>Blood Chem: | | High:<br>Low: | —407 | |

Final Report and Assessment — 403

| Assessment of results | Recommended Treatment/Med. |
|---|---|
| | —409 |

Physicians Statement — 405

*I have completed the medical examination of (Mr./Mrs./Ms)...................*
*to the best of my knowledge, I confirm that the above information is correct.*

| Name of Physician: | 411 |
|---|---|
| Hospital: | |
| Signature: | |
| Date: | |

Figure 4

PATIENT FOLLOW UP REPORT

PATIENT DETAILS

| Patient Name  Oscar Mike | Patient ID:  613545 |
|---|---|
| Doctor Name: Brooke Green | Date:  7/1/2013 |

| Follow Up Tests ||||| 
|---|---|---|---|---|
| Blood Test | ECG | BP Test | Blood Sugar Level | Pupil Dilation Test |
| CBC:<br>Blood Chem: | | High:<br>Low: | | |
| Assessmer | | | | reatment/Med. |

Wrong Location!

This field is not available to fill because you're at the wrong location. Access is denied.

Physicians Statement

*I have completed the medical examination of (Mr./Mrs./Ms)..............*
*to the best of my knowledge, I confirm that the above information is correct.*

| Name of Physician: |
|---|
| Hospital: |
| Signature: |
| Date: |

Figure 6

LOCATION CONSTRAINTS FOR TEMPLATE ACCESS AND FORM ACTIVITIES

BACKGROUND OF THE INVENTION

1. Field of the Invention

The specification relates to a system and method for limiting access to one or more forms. In particular, the specification relates to accessing the one or more forms and annotating handwriting strokes based on location constraints associated with the one or more forms.

2. Description of the Background Art

Portable computing devices can be used to input information into forms. Users who are required to fill out paperwork regularly while assigned to a task will input information using a stylus and approve the form for storing and processing. However, some users will try to submit forms fraudulently without attending to the task personally or fill out information on an incorrect form. This increases fraud and error in industries where filling out paperwork regularly and accurately is crucial.

SUMMARY OF THE INVENTION

The disclosure overcomes the deficiencies of the prior art with a system and method for limiting access to one or more forms based on a location constraint. In one embodiment, the system includes a form access module. The form access module is configured to retrieve one or more forms on a portable computing device, to determine a location of the portable computing device, to determine whether the location of the portable computing device is within a region where form access is granted, to grant access to the one or more forms responsive to the location of the portable computing device determined to be within the region, to receive strokes from a first user in at least one field on the one or more forms and to store the one or more forms and the strokes received on the one or more forms.

Other aspects include corresponding methods, systems, apparatuses, and computer program products for these and other innovative aspects.

This results in form processing that is less error prone. The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The invention is illustrated by way of example, and not by way of limitation in the figures of the accompanying drawings in which like reference numerals are used to refer to similar elements.

FIG. 3 is a graphic representation of an example form.

FIG. 4 is a graphic representation of a form including location constrained fields that is received by a portable computing device.

FIG. 6 is a graphic representation of an embodiment of a user interface that displays a form including a pop up window indicating a wrong location of the portable computing device.

DETAILED DESCRIPTION OF THE PREFERRED EMBODIMENTS

Figure 1:
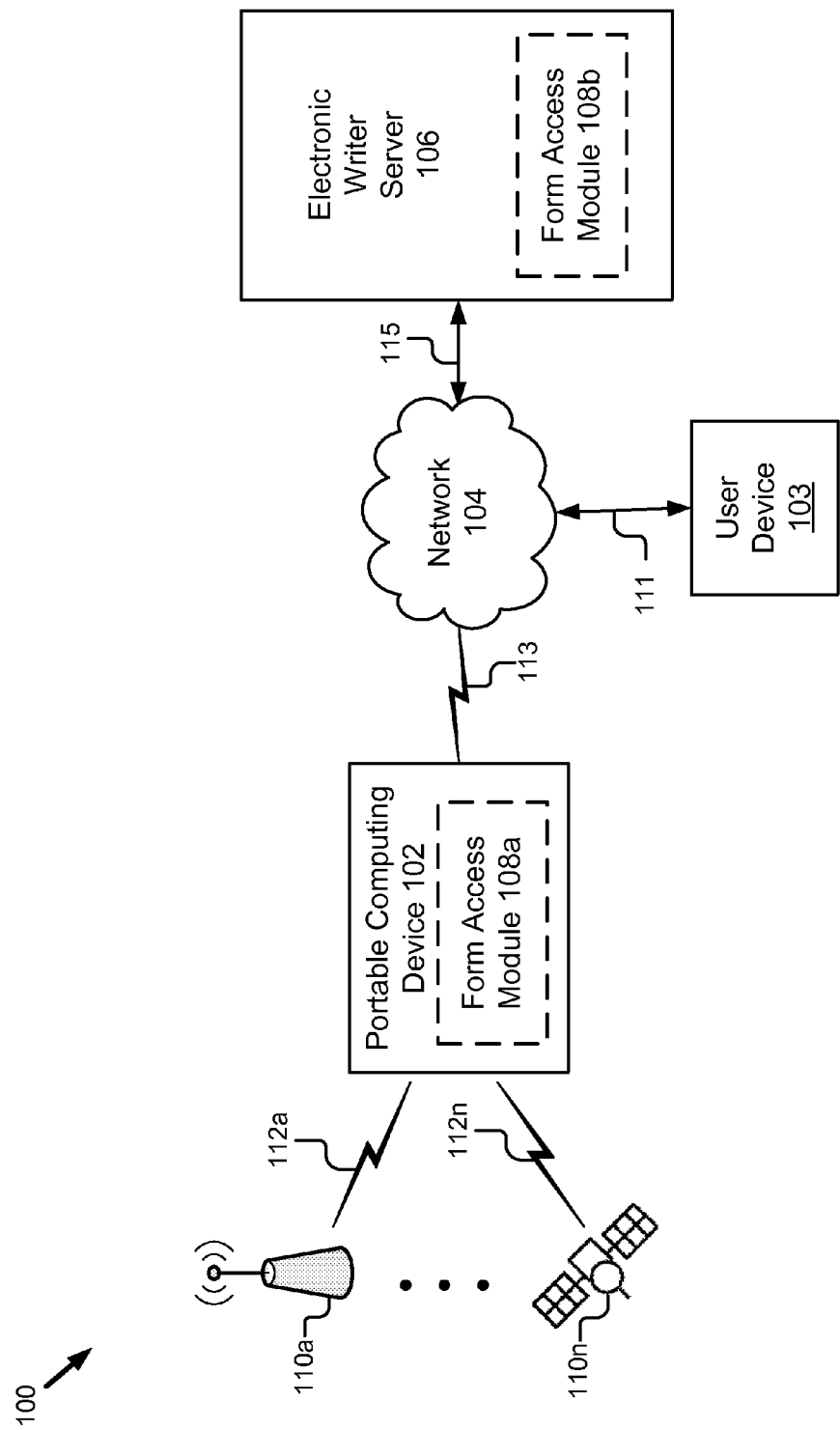
FIG. 1 is a high-level block diagram illustrating one embodiment of a system for providing access to one or more forms based on a location constraint.

A description of a system and method for accessing one or more forms and annotating handwriting strokes on the forms based on location constraints follows. For purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a high-level block diagram of a system 100 for providing access to one or more forms based on a location constraint. The illustrated embodiment of the system 100 comprises: a portable computing device 102, one or more position transmitting devices 110a-110n and an electronic writer server 106 that are each communicatively coupled to the network 104. In FIG. 1 and the remaining figures, a letter after a reference number, for example, "110a" is a reference to the element having that particular reference number. A reference number in the text without a following letter, for example "110," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 104 is coupled to the portable computing device 102, the one or more position transmitting devices 110a-110n, and the electronic writer server 106, in practice any number of networks 104 can be connected to the entities.

The one or more position transmitting devices 110a-110n are each wirelessly coupled to the portable computing device 102 and the network 104 via signal lines 112a-112n respectively. The position transmitting device 110 is any device transmitting a message signal including positional and timing information (e.g., Time of Arrival (ToA), Angle of Arrival (AoA), etc.) to a portable computing device 102 to determine the location of the portable computing device 102. For example, the position transmitting device 110 can be a Global Positioning System (GPS), Wireless Access Point (WAP), indoor positioning system (IPS), etc.

The portable computing device 102 is wirelessly coupled to the network 104 via signal line 113 respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive forms, add stroke annotations to the forms and send the annotated forms to the electronic writer server 106. A form is any electronic document that includes fields (i.e., blank spaces) for insertion of required or requested information. The form when filled out with the requested information may be a statement, an order, a request, etc. For example, a form can be a tax form, an insurance form, a medical form, an inspection form, a vehicle usage log, an electronic check, a job application, a survey, a receipt, etc.

In one embodiment, the portable computing device 102 is a tablet computer including a computing pad and a stylus. The computing pad is adapted to display a form and capture any strokes written on the form using the stylus or a fingertip of the user. The strokes are typically displayed immediately on top of the form, just as if written by pen on paper. The computing pad usually captures the strokes as a sequence of points or segments along with location, timing and pressure information. The computing pad sends the forms to the electronic writer server 106 including the captured strokes in any image format known to persons of ordinary skill in the art, for example, a scalable vector graphics (SVG) file format, which can contain both strokes and images or Ink Markup Language (InkML). In one embodiment, the computing pad attaches the information associated with the strokes, for example, the location, the pressure profiles and timing information with the form as metadata.

The portable computing device 102 determines location information by using global positioning system (GPS) circuitry included within the device itself to determine its location. In one embodiment, the portable computing device 102 accesses a database including pairs of media access control (MAC) addresses and locations over the Internet. To determine a location, the portable computing device 102 only retrieves the location corresponding to the access point MAC address from the database. For determining the portable computing device's 102 location indoors, the portable computing device 102 employs radio frequency, ultra-sound signal or invisible light communication. For example, the portable computing device 102 determines its location through wireless access points based on measuring the intensity of received signals. In one embodiment, the integration of a GPS-enabled portable computing device 102 with location sensing through wireless access points is determined to resolve location sensing to a few feet, etc. In another embodiment, similar position transmitting devices will resolve location sensing to closer than a few feed. Although only one portable computing device 102 is illustrated, persons with ordinary skill in the art will recognize that any number of portable computing devices 102 can be coupled to the network 104. In one embodiment, a form access module 108*a* is operable on the portable computing device 102.

The user device 103 is coupled to the network 104 via the signal line 111. The user device 103 is any computing device that includes a memory and a processor, for example, a desktop computer, a laptop computer, etc. The user device 103 is adapted to send and receive data to and from the electronic writer server 106. In one embodiment, the user device 103 includes software for annotating location constraints on geographical maps and adding the location constraints to one or more forms as metadata. For example, the user device 103 sends a request to the electronic writer server 106 to add location constraints on accessing a form. The user device 103 is accessed by users that have permission to access information from the electronic writer server 106, such as a creator of the form sent to a portable computing device 102 or an administrator of the electronic writer server 106. The user device 103 includes a display for viewing information provided by the electronic writer server 106. Although only one user device 103 is illustrated, persons with ordinary skill in the art will recognize that any number of user devices 102 can be coupled to the network 104.

The electronic writer server 106 is any computing device including a memory and a processor which is coupled to the network 104 via signal line 115. In one embodiment, the electronic writer server 106 processes completed forms that are submitted from the form access module 108. In one embodiment, the form access module 108*b* is operable on the electronic writer server 106. The form access module 108 can be stored in part on the portable computing device 102 and in part on the electronic writer server 106, for example, as a thin-client application on the portable computing device 102. Alternatively, a full version of the application can be stored in each place.

The form access module 108 is described in further detail below with reference to FIG. 2. In one embodiment, the form access module 108 retrieves one or more forms on a portable computing device, determines a location of the portable computing device, determines whether the location of the portable computing device is within a region where form access is granted, grants access to the one or more forms responsive to the location of the portable computing device being within the region, receives strokes from a first user in at least one field on the one or more forms and stores the one or more forms and the strokes received on the one or more forms.

Form Access Module 108

Figure 2:
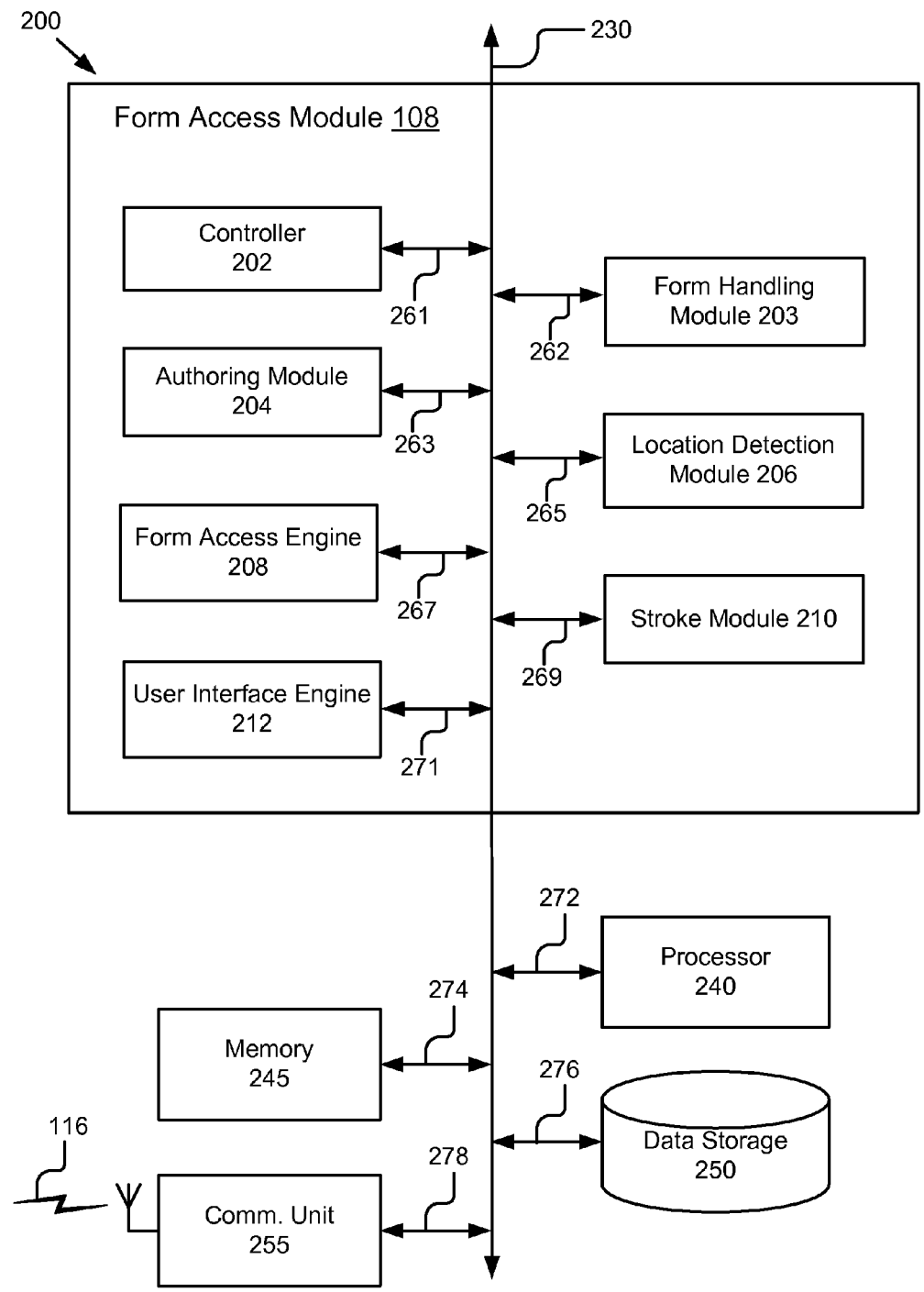
FIG. 2 is a block diagram illustrating one embodiment of a form access module in more detail.

Referring now to FIG. 2, the form access module 108 is shown in more detail. FIG. 2 is a block diagram of a computing device 200 that includes a processor 240, a memory 245, a communication unit 255, data storage 250 and the form access module 108. In one embodiment the computing device 200 is the electronic writer server 106. In another embodiment, the computing device 200 is the portable computing device 102.

The processor 240, the memory 245, the communication unit 255 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and optionally provide electronic display signals to a display device. The processor 240 is coupled to the bus 230 for communication with the other components of the computing device 200 via signal line 272. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components of the computing device 200 via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives data such as requests from the portable computing device 102 and transmits the requests to the form access engine 208, for example a request for retrieving a form data. The communication unit 255 also receives information, such as form data, from the electronic writer server 106. The communication unit 255 transmits information including form data to the portable computing device 102 for display, for example, in response to a request. The communication unit 255 is coupled to the bus 230 via signal line 278. In one embodiment, the communication unit 255 includes a port for direct physical connection to the portable computing device 102 or to another communication channel. For example, the communication unit 255 includes an RJ45 port or similar port for wired communication. In another embodiment, the communication unit 255 includes a wireless transceiver 116 for exchanging data with the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores information associated with a plurality of forms received by the computing device 200. The data storage 250 is coupled to the bus 230 for communication with the other components via signal line 276. In one embodiment, the data storage 250 stores blank forms, as well as metadata describing the identity and the location of fields, labels, images and/or symbolic text for labels on the blank form image that corresponds to the completed form data. In one embodiment, the data storage 250 receives location constraints associated with the one or more forms as metadata. In one embodiment, the data storage 250 receives map data including annotations of location constraints on the map. In one embodiment, the data storage 250 stores the handwriting stroke data in a data format, such as, InkML, SVG, etc. The stroke metadata also includes stroke information including a date and time that each stroke was input and the location of each stroke.

In one embodiment, the form access module 108 comprises a controller 202, a form handling module 203, an authoring module 204, a location detection module 206, a form access engine 208, a stroke module 210 and a user interface engine 212.

The controller 202 is software and routines for receiving data via the communication unit 255, routing the data to the appropriate engine or module and transmitting responses from modules or engines to the communication unit 255 for transmitting to the portable computing device 102 and other components of the system 100. In one embodiment, the controller 202 is a set of instructions executable by the processor 240 to provide the functionality described below for managing data transfer between the components of the computing device 200 and other components of the system 100. In another embodiment, the controller 202 is stored in the memory 245 and is accessible and executable by the processor 240. In either embodiment, the controller 202 is adapted for cooperation and communication with the processor 240, the communication unit 255, the form handling module 203, the authoring module 204, the location detection module 206, the form access engine 208, the stroke module 210, the user interface engine 212 and other components of the computing device 200 via signal line 261.

The form handling module 203 is software and routines for handling forms. In one embodiment, the form handling module 203 is a set of instructions executable by the processor 240 to provide the functionality described below for handling forms or identifying fields in pre-existing forms. In another embodiment, the form handling module 203 is stored in the memory 245 and is accessible and executable by the processor 240. In either embodiment, the form handling module 203 is adapted for cooperation and communication with the processor 240, the communication unit 255, other components of the computing device 200 via signal line 262.

In one embodiment, the form handling module 203 generates one or more types of forms for a user to complete. For example, the form handling module 203 generates forms relating to visitor registration, patient health checkup, expense report, machinery inspection report, vehicle mileage log, bank enrollment, etc. The form handling module 203 specifies the coordinates of form fields, labels of individual fields and labels of groups of fields in the form. In one embodiment, the form handling module 203 generates a field identifier for each identified field and a label identifier for each identified label in the one or more types of forms. The one or more types of forms are assigned form identifiers. The form handling module 203 provides the blank form data and metadata describing the identity and the location of fields, labels, images and/or symbolic text for labels on the blank form data to the portable computing device 102.

In one embodiment, the form handling module 203 receives form data for one or more forms that are filled out with handwriting strokes and attached with one or more types of media from the portable computing device 102. The form handling module 203 collects the form data, handwriting strokes and media associated with the forms for storage.

The authoring module 204 is software and routines for adding constraints on one or more forms. In one embodiment, the authoring module 204 is a set of instructions executable by the processor 240 to provide the functionality described below for adding constraints on a form. In another embodiment, the authoring module 204 is stored in the memory 245 and is accessible and executable by the processor 240. In either embodiment, the authoring module 204 is adapted for cooperation and communication with the controller 202, the data storage 250 and other components of the computing device 200 via signal line 263.

In one embodiment, the authoring module 204 receives annotations from the user device 103 that identify a location constraint on a geographical map. The geographical map is retrieved from a web mapping service application, such as Google™ Maps. In one embodiment, the authoring module 204 receives an annotation of geographic coordinates (e.g., latitude, longitude, elevation, etc.) of a location and a radius for specifying a constrained area surrounding the location on a geographical map. For example, the authoring module 204 receives geographical coordinates for a nursing home and a radial distance of 300 yards to specify a constrained area with the nursing home as the center of the constrained area. In another embodiment, the authoring module 204 receives an annotation of at least three points on the geographical map that specify a polygonal shape including a closed chain of geographical coordinates for creating a constrained area. For example, the authoring module 204 receives annotations for a rectangular shaped polygon surrounding the geographical coordinates for a nursing home location and the authoring module 204 creates a rectangular constrained area which is a closed chain of geographical coordinates in a rectangular shape. In one embodiment, the authoring module 204 receives annotations from the user device 103 on a floor map of a building to identify location constraints. For example, the authoring module 204 receives a selection of a room or floor in a building for creating a constrained area in the floor map of the building.

The authoring module 204 receives forms from the form handling module 203 or retrieves one or more forms from the data storage 250. In one embodiment, the authoring module 204 receives a request to add the location constraint created on the geographical map and/or floor map to the one or more forms as metadata. The authoring module 204 stores the one or more forms back in the data storage 250. A form with an associated location constraint is accessible on a portable computing device 102 if the location determined for the portable computing device 102 matches the location constraint added onto the form. For example, a safety inspector inspecting several facilities (e.g., turbine room, cooling towers, generator room, etc.) in a power plant with a tablet will have access limited to inspection forms associated with each facility based on location and can only open the inspection forms if the safety inspector with the tablet is at each facility's location.

In another embodiment, the authoring module 204 receives a selection of at least one field on the form from the user device 103 and a request to constrain the selected fields by location. A field constrained by location on a form is accessible on a portable computing device 102 if the location determined for the portable computing device 102 matches the location constraint on the field in the form. For example, a healthcare worker with a tablet visiting a first patient at their residence would be unable to add stokes on a signature field (the field appears, for example, as viewable but shaded gray and does not accept strokes) on the health checkup form until the tablet is within a few yards of the patient's residence. In another example, the healthcare worker visiting a second patient at the second patient's residence would be unable to add strokes to the field associated with a blood test on the health checkup form because the purpose of visiting the second patient is not to retrieve blood for the blood test. In one embodiment, the authoring module 204 receives a first location constraint for a first field and a second location constraint for a second field on the same form.

In yet another embodiment, the authoring module 204 receives a request from the user device 103 to constrain the submission to the electronic writer server 106 of a form including handwriting strokes by location. A form with an associated location constraint and including handwriting strokes received through the portable computing device 102 gets stored in the electronic writer server 106 if the location of the portable computing device 102 matches the location constraint on the form submission. For example, a health care worker with a tablet filling in a health checkup form for a patient can submit the form after annotating strokes on the form only if the health care worker is present at the patient's residence.

In one embodiment, the authoring module 204 stores location constraints associated with the forms as metadata in the data storage 250. In another embodiment, the authoring module 204 transmits the metadata associated with the forms indicating location constraints to the form access engine 208 and the stroke module 210.

The location detection module 206 is software and routines for determining the location of the portable computing device 102 and generating a location stamp for adding to one or more forms. In one embodiment, the location detection module 206 is a set of instructions executable by the processor 240 to provide the functionality described below for determining the device location and generating the location stamp for adding to the form. In another embodiment, the location detection module 206 is stored in the memory 245 and is accessible and executable by the processor 240. In either embodiment, the location detection module 206 is adapted for cooperation and communication with the controller 202, the form access engine 208, the data storage 250 and other components of the computing device 200 via signal line 265.

In one embodiment, the location detection module 206 determines the location of a portable computing device 102 and transmits the location information to the form access engine 208 which is described in more detail below. For example, a tablet PC includes GPS circuitry and the location detection module 206 receives the location data from the GPS circuitry. In another example, the tablet PC measures the signal intensity of wireless access points in a room or a floor and the location detection module 206 determines the tablet PC's location based on the measured signal strength.

In one embodiment, the location detection module 206 determines a location stamp based on the location data. The location detection module 206 transmits the location stamp to the form access engine 208 to provide confirmation of whether the location constraint associated with a form is satisfied or not. The location stamp is valuable for debugging in cases where the portable computing device 102 is in the constrained location where the form access engine 208 should allow access to forms for that location but fails to provide access to the portable computing device 102. In these circumstances an administrator could compare the location stamp to the location constraint and override the restriction if the location stamp is within the location constraint.

In another embodiment, the location detection module 206 annotates the geographical map and/or the floor map to indicate the location detected for the portable computing device 102 and transmits the annotated map data to the form access engine 208. For example, if the location of the tablet PC is at least 500 yards of a nursing home, the location detection module 206 annotates the detected location on a geographical map and sends the annotated map data to the form access engine 208.

The form access engine 208 is software and routines for providing access to one or more forms and at least one field in the one or more forms based on the location constraint associated with the one or more forms. In one embodiment, the form access engine 208 is a set of instructions executable by the processor 240 to provide the functionality described below for providing access to the one or more forms. In another embodiment, the form access engine 208 is stored in the memory 245 and is accessible and executable by the processor 240. In either embodiment, the form access engine 208 is adapted for cooperation and communication with the controller 202, the authoring module 204, the location detection module 206, the stroke module 210, the data storage 250 and other components of the computing device 200 via signal line 267.

In one embodiment, the form access engine 208 retrieves one or more forms from the data storage 250 in response to a request from the user device 103. In another embodiment, the form access engine 208 retrieves one or more forms from the data storage 250 based on the location of the portable computing device 102. The location of the portable computing device 102 is detected by the location detection module 206. The retrieved forms include location constraints added as metadata to the forms by the authoring module 204. In one embodiment, the form access engine 208 compares whether the location detected for the portable computing device 102 is less than a radial distance from the center of a constrained area as specified by the location constraint metadata for the forms. In another embodiment, the form access engine 208 determines whether the location of the portable computing device 102 is within a polygon traced by a closed chain of geographical coordinates as specified by the location constraint metadata for the forms. The form access engine 208 grants access to open the forms only when the location of the portable computing device 102 matches the location constraint on the forms and adds the location stamp received from the location detection module 206 to the form. For example, a healthcare worker is 200 yards from the patient's house and the radial distance specified in the location constraint metadata for a health checkup form is 300 yards from the patient's house. The healthcare worker can retrieve and open the health checkup form on a tablet PC. In another example, a safety inspector is located within a chain of geographical coordinates that trace a rectangular polygon covering a smelting factory as specified in the location constraint for an inspection form. The safety inspector can retrieve and open the inspection form on a tablet PC inside the smelting factory.

In one embodiment, the important fields on a form are automatically displayed as being shaded or dimmed to indicate to the user that the user is prohibited from adding strokes using the authoring module 204. In one embodiment where the location of the portable computing device 102 is within the threshold of the location constraint, the form access engine 208 grants access to input strokes on at least one field in a form. For example, a healthcare worker visiting a list of patients at their residence uses a single health checkup form for all the patients. The form access engine 208 compares whether the location of the healthcare worker's tablet PC matches the location constraint in the health checkup form added for each residence in the list of patients. If the tablet PC's location matches the location constraint, the form access engine 208 removes the restriction (i.e., the form access engine 208 removes the gray shading obstructing the field) placed on adding handwriting strokes by the healthcare worker. The healthcare worker can add strokes on a signature field on the health checkup form if the healthcare worker is at a first patient's residence. If the tablet PC's location does not match the location constraint, the form access engine 208 retains the restriction placed on adding strokes by the healthcare worker. The healthcare worker cannot add strokes on a field associated with a blood test on the health checkup form if the healthcare worker is at a second patient's residence. The form is then sent to the stroke module 210 for receiving handwriting strokes, which is described in more detail below.

In one embodiment, the form access engine 208 allows a user to input data into the fields, but the form access engine 208 prohibits submission of the form if location of the portable computing device 102 fails to match the location constraint. The submission of a form to the electronic writer server 106 is constrained by location to prevent the user submitting the form from an incorrect location. If the location of the portable computing device 102 matches the location constraint, the form access engine 208 allows a completed form including handwriting strokes to be stored in the data storage 250. For example, a safety inspector inspecting several facilities (e.g., furnace, turbine room, etc.) on a power plant uses different forms for inspection for each type of facility. The form access engine 208 compares whether the location of the safety inspector's tablet PC matches the location constraint in an inspection form for each facility. If the tablet PC's location matches the location constraint, the form access engine 208 accepts the completed form data including handwriting strokes for submission to the electronic writer server 106 and for storage in the data storage 250. In one embodiment, if the inspector's tablet PC has visited a location matching the location constraint within a specified time period the form access engine 208 accepts the completed form data.

In one embodiment, the form access engine 208 receives data including the detected location of the portable computing device 102 on a geographical map and/or a floor map from the location detection module 206. Responsive to the portable computing device 102 not satisfying the location constraint on the forms, the form access engine 208 instructs the user interface engine 212 to generate a notification indicating that the user is at a wrong location. In one embodiment, the form access engine 208 determines a correct location on the geographical map and/or the floor map where the portable computing device 102 satisfies the location constraint on the forms. The form access engine 208 then instructs the user interface engine 212 to generate graphical data for displaying the correct location on the geographical map and/or the floor map for the portable computing device 102 to move to for form access.

In one embodiment, the location detection module 206 determines whether the portable computing device 102 was within the location within a specified period of time. For example, the location detection module 206 periodically checks the location of the portable computing device 102 and the form access engine 208 temporarily provides access to the form by allowing the user to input strokes or allows the user to submit the form based on the location. In another embodiment, the location detection module 206 periodically checks the location of the portable computing device 102 and if the portable computing device was within the region where form access is granted at any period in time, the form access engine 208 provides access to the form. For example, the user of the portable computing device 102 enters a room with a patient, but the user prefers to write notes about the encounter from the user's desk. Because the portable computer device 102 was within the region for providing form access (i.e. the patient's room), the form access engine 208 removes limitations for accessing the form.

The stroke module 210 is software and routines for receiving stroke data from a user and rendering the stroke data on the form. In one embodiment, the stroke module 210 is a set of instructions executable by the processor 240 to provide the functionality described below for receiving and rendering the stroke data on the form. In another embodiment, the stroke module 210 is stored in the memory 245 and is accessible and executable by the processor 240. In either embodiment, the stroke module 210 is adapted for cooperation and communication with the processor 240, the authoring module 204, the form access engine 208, the user interface engine 212, the data storage 250 and other components of the computing device 200 via signal line 269.

In one embodiment, the stroke module 210 receives the form from the form access engine 208 after location constraints on the form are matched with the location of the portable computing device 102. In one embodiment, the stroke module 210 receives stroke data in at least one field on the form. For example, a healthcare worker annotates a health checkup form to include the follow up tests carried out on a patient, such as a blood pressure test, a pupil dilation test, etc. In another example, a safety inspector annotates an inspection form with the wear and tear of machines in a factory and also adds his signature to approve his inspection of the machines.

The stroke data is a list of x-y locations where the stylus, pen or other pointing device, like a finger, was sensed and the time of contact. In addition to the x-y locations, the stroke module 210 captures the time of each stroke or each point, the pressure of the stylus, which stylus was used or which end of a stylus was used. In some embodiments, the stroke module 210 converts the stroke data into a vector description ordered by the time of writing including color, width and pressure information. The stroke module 210 stores the vector description of the strokes in the data storage 250. In one embodiment, the stroke module 210 saves the captured strokes as Scalable Vector Graphics (SVG) data.

In one embodiment, the stroke module 210 renders the strokes onto the form by converting the vector description into line data, filled with pixels based on the color, width and pressure information. In another embodiment, the stroke module 210 saves the form and the strokes as metadata of the form in the data storage 250. The stroke module 210 renders the strokes using standard algorithms for rendering lines. In one embodiment, the stroke module 210 transmits the rasterized data to the user interface engine 212 and instructs the user interface engine 212 to display the form filled with the handwriting strokes.

The user interface engine 212 is software including routines for generating graphical data for displaying a user interface that includes the form where handwriting strokes are added to one or more fields in the form. In one embodiment, the user interface engine 212 is a set of instructions executable by the processor 240 to generate the user interface. In another embodiment, the user interface engine 212 is stored in the memory 245 and is accessible and executable by the processor 240. In either embodiment, the user interface engine 212 is adapted for cooperation and communication with the processor 240 and other components of the computing device 200 via signal line 271.

In one embodiment, responsive to a user of a portable computing device 102 requesting to open a form at a location, the user interface engine 212 generates graphical data for displaying a form into which stroke data from the user can be inserted. In another embodiment, the user interface engine 212 retrieves the form from the data storage 250 and generates graphical data for displaying the form with one or more fields shaded gray to prevent the user from adding handwriting strokes to the form. In one embodiment, the graphical data could include Hypertext Markup Language and Cascading Style Sheets (HTML and CSS) descriptions for the portable computing device 102 to render the form. In one embodiment, the user interface engine 212 receives instructions from the stroke module 210 to render strokes on the form based on the vector description. In one embodiment, responsive to the user of the portable computing device 102 not satisfying a location constraint on a form, the user interface engine 212 generates graphical data for displaying a map indicating the wrong location detected for the portable computing device 102 and a correct location the user should reach.

Example User Interfaces

Turning now to FIG. 3, a graphic representation of an example form 300 is illustrated. The example form 300 includes a number of fields including a handwriting field 301 for a patient follow up report used by a healthcare worker visiting patients at their residence. The fields have corresponding labels such as, "Patient name" 303, "Patient ID" 305, "Signature" 307, etc. A user fills in a field by inputting handwriting strokes inside the boxes provided corresponding to the labels.

FIG. 4 is a graphic representation of an example form 400 that includes highlighting of the fields where the fields are constrained by location. The example form 400 is a patient follow up report filled out by healthcare workers visiting patients at their residence. The example form 400 includes fields under the sub-heading "Follow Up Tests" 401 for receiving stroke input on the tests performed on the patient, fields under the sub-heading "Final Report and Assessment" 403 for receiving stroke input on the patient assessment and recommended treatment and fields under the sub-heading "Physicians Statement" 405 for receiving stroke input from the attending healthcare worker approving the patient follow up report. In one embodiment, the creator of the form identifies a "BP Test" field 407, the "Assessment of results" field 409 and the "Signature" field 411 in the example form 400 as fields that are constrained by location using an authoring tool. In the graphic representation, the location-constrained fields are illustrated with small dashes. The creator of the form identifies the fields as location-constrained fields to prevent the healthcare worker from inputting strokes in the field on the portable computing device 102 if the healthcare worker is not present at a patient's house. In one embodiment, the fields are associated with different location constrains. For example, the form could be used in a hospital where the healthcare worker has to bring the patient to a different room to take the patient's blood pressure. As a result, the "BP Test" field 407 has a different location constraint than the "Assessment of results" field 409 and the "Signature" field 411.

Figure 5A:
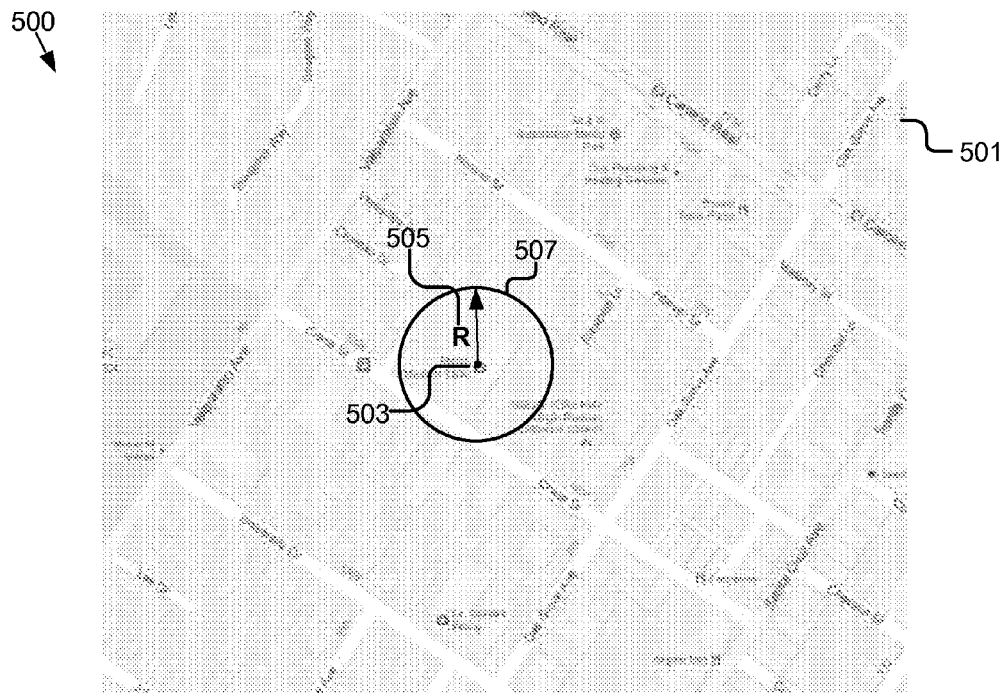
FIGS. 5A-5B are graphic representations for annotating a location constraint on a geographical map.
Figure 5B:

FIGS. 5A-5B are graphic representations 500 of geographic maps 501, 502 that include annotations of the location constraints. In the graphic representation of FIG. 5A, the geographic map 501 includes annotations of geographic coordinates of a location 503 and a radius "R" 505 for creating a circular constrained area 507. A user's portable computing device 102 is considered to be within the constrained area if the portable computing device's distance from the location 503 is less than the radius "R" 505.

In the graphic representation of FIG. 5B, the geographic map 502 includes annotations of a polygonal shape tracing a closed chain of geographical coordinates for creating a rectangular constrained area 509. A user's portable computing device 102 is considered to be within the constrained area if the location coordinates of the portable computing device 102 is within the polygonal shape traced using the closed chain of geographical coordinates. For instances, if the latitude/longitudinal coordinates of the chain were (−2,−1), (−2,1), (2, 1) and (2,−1), the point (0,0) would be within the chain and the point (3, −3) would be outside the chain or location constraint.

FIG. 6 is a graphic representation of an embodiment of a user interface 600 that displays a form including a pop up window 607 indicating a wrong location of the portable computing device 102. In this graphic representation, the user interface 600 includes a "Patient Follow Up Report" form 601 retrieved on a portable computing device 102. The form 601 includes the handwriting strokes "Oscar Mike" 603 input in a handwriting field by a healthcare worker using the portable computing device 102. Upon the healthcare worker trying to input strokes in the field 605 under "BP Test", the user interface 600 shades the "BP Test" field gray and displays a pop up 607 indicating that the healthcare worker is at a wrong location to access the field on the form 601.

Figure 7:
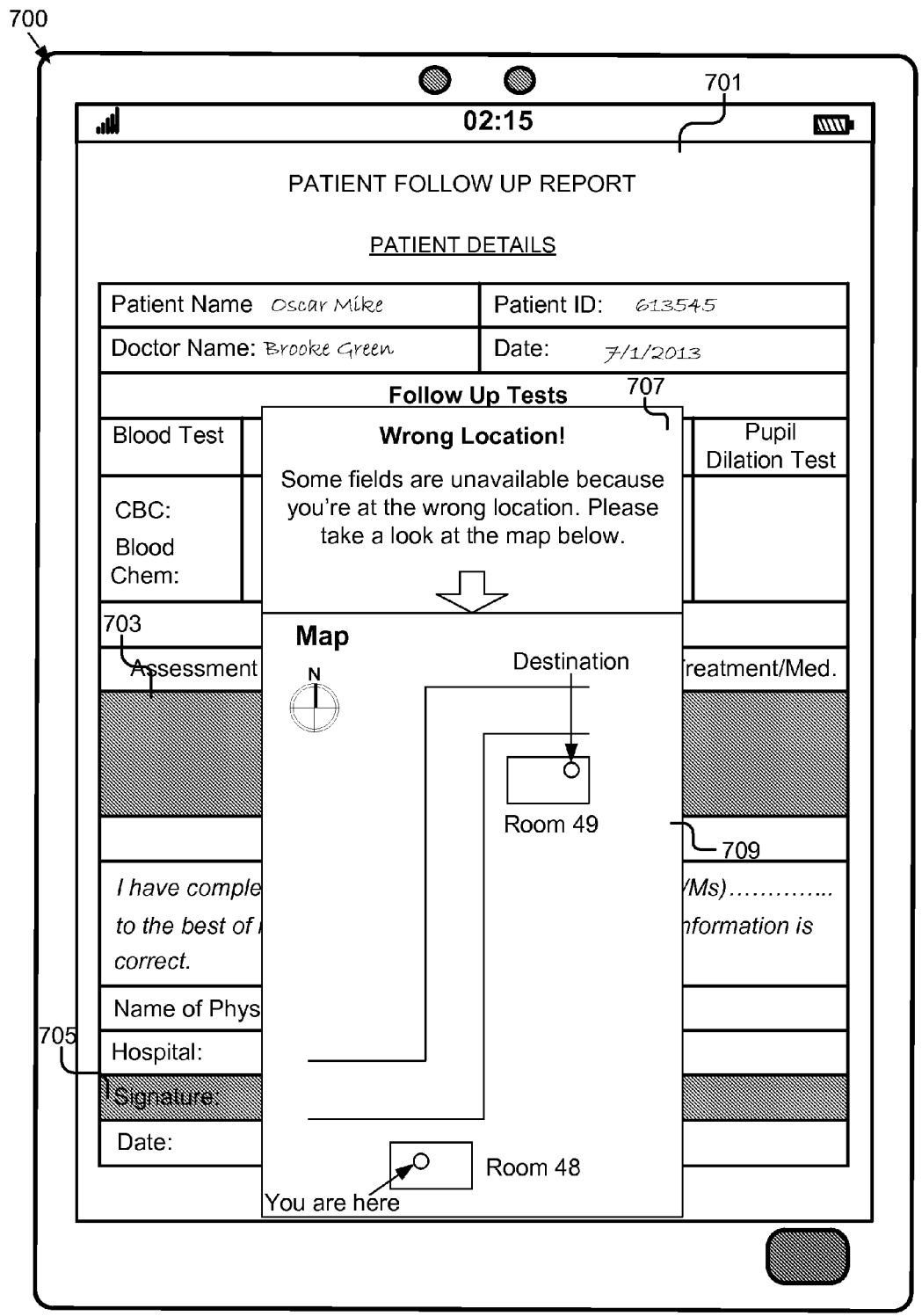
FIG. 7 is a graphic representation of an embodiment of a user interface that displays a modified form including a map pointing to a correct location for the portable computing device.

FIG. 7 is a graphic representation of an embodiment of a user interface 700 that displays a modified form including a map pointing to a correct location for the portable computing device 102. In this graphic representation, the user interface 700 modifies the form 701 responsive to the location of the portable computing device 102 not matching the location constraint on the form 701. The form 701 includes a field associated with "Assessment of results" 703 shaded gray to prevent the healthcare worker from adding strokes to the field. Similarly, the field associated with the "Signature" 705 is shaded in the form 701. Upon the user trying to input strokes in the shaded fields on the form 701, the user interface 700 displays a pop up window 707 indicating that the healthcare worker is at a wrong location to access the shaded fields on the form 701. The user interface 700 also includes an overlay of a map 709 on the form 701 indicating a detected location for the portable computing device 102. The map is a floor map of the building and the map also points to a correct location that the healthcare worker should reach to access the shaded fields on the form 701.

Methods

Figure 8:
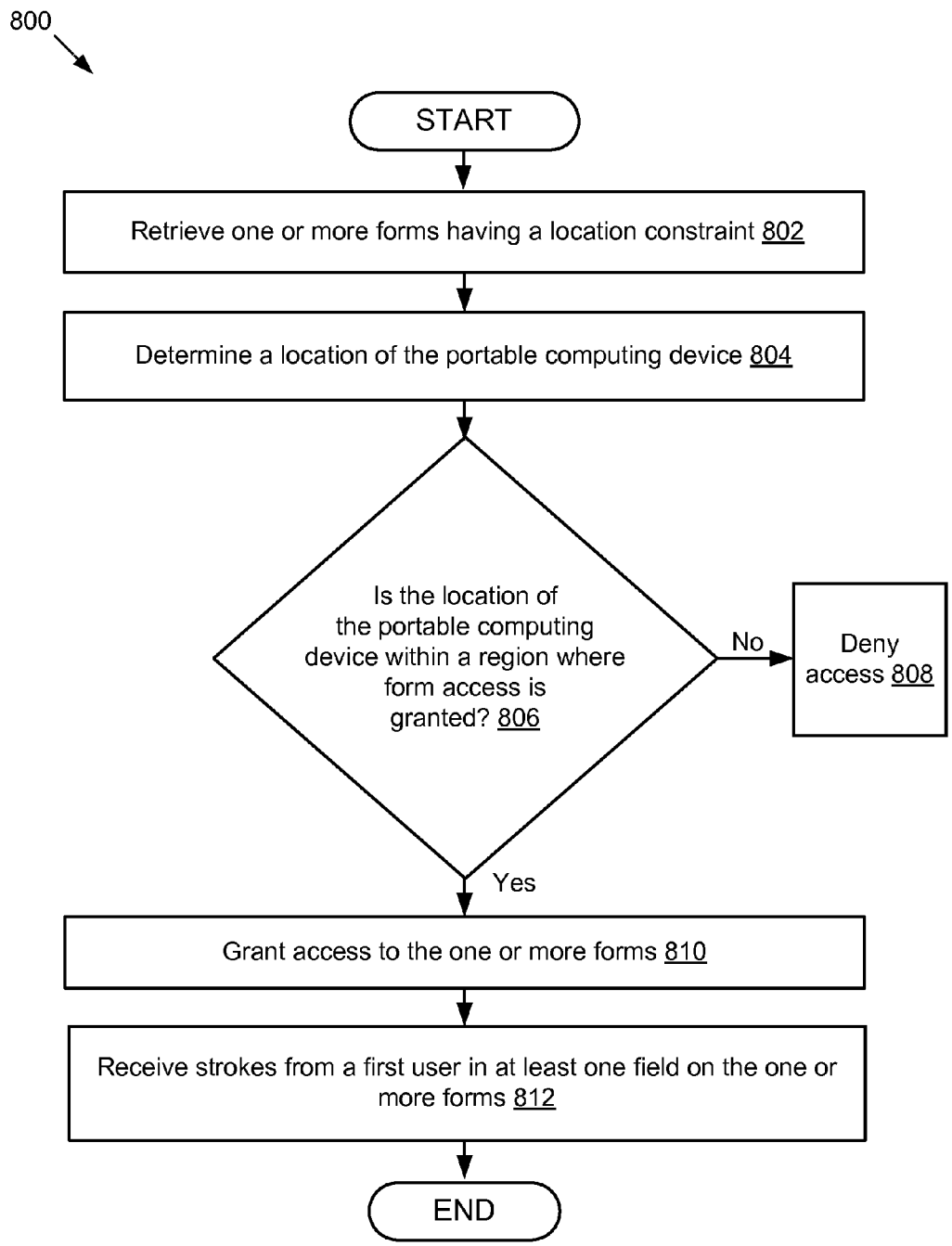
FIG. 8 is a flow diagram of one embodiment of a method for accessing one or more forms based on a location constraint.

Referring now to FIGS. 8-11, various embodiments of the methods of the invention will be described. FIG. 8 is a flow diagram 800 of an embodiment of a method for accessing one or more forms based on a location constraint. The form access module 108 includes a location detection module 206, a form access engine 208 and a stroke module 210. In one embodiment, the form access engine 208 retrieves 802 one or more forms having a location constraint. The location detection module 206 determines 804 a location of the portable computing device 102. For example, a tablet PC includes GPS circuitry and the location detection module 206 receives the location data from the GPS circuitry. The form access engine 208 determines 806 whether the location of the portable computing device 102 is within a region where form access is granted. For example, the form access engine 208 compares whether the location detected for the portable computing device 102 is less than a radial distance from the center of a constrained area as specified by the location constraint metadata for the form. In another example, the form access engine 208 determines whether the location of the portable computing device 102 is within a polygon traced by a closed chain of geographical coordinates as specified by the location constraint metadata for the form. If not, the form access engine 208 denies 808 access to the form. Responsive to determining that the location of the portable computing device is within the region where form access is granted, granting 810 access to the one or more forms. The stroke module 210 receives 812 strokes from a user on the form based on the location of the portable computing device 102 matching the location constraint of the form and stores the form and the strokes received on the form. For example, a healthcare worker can add strokes on a signature field on the health checkup form if the healthcare worker is at a first patient's residence.

Figure 9:
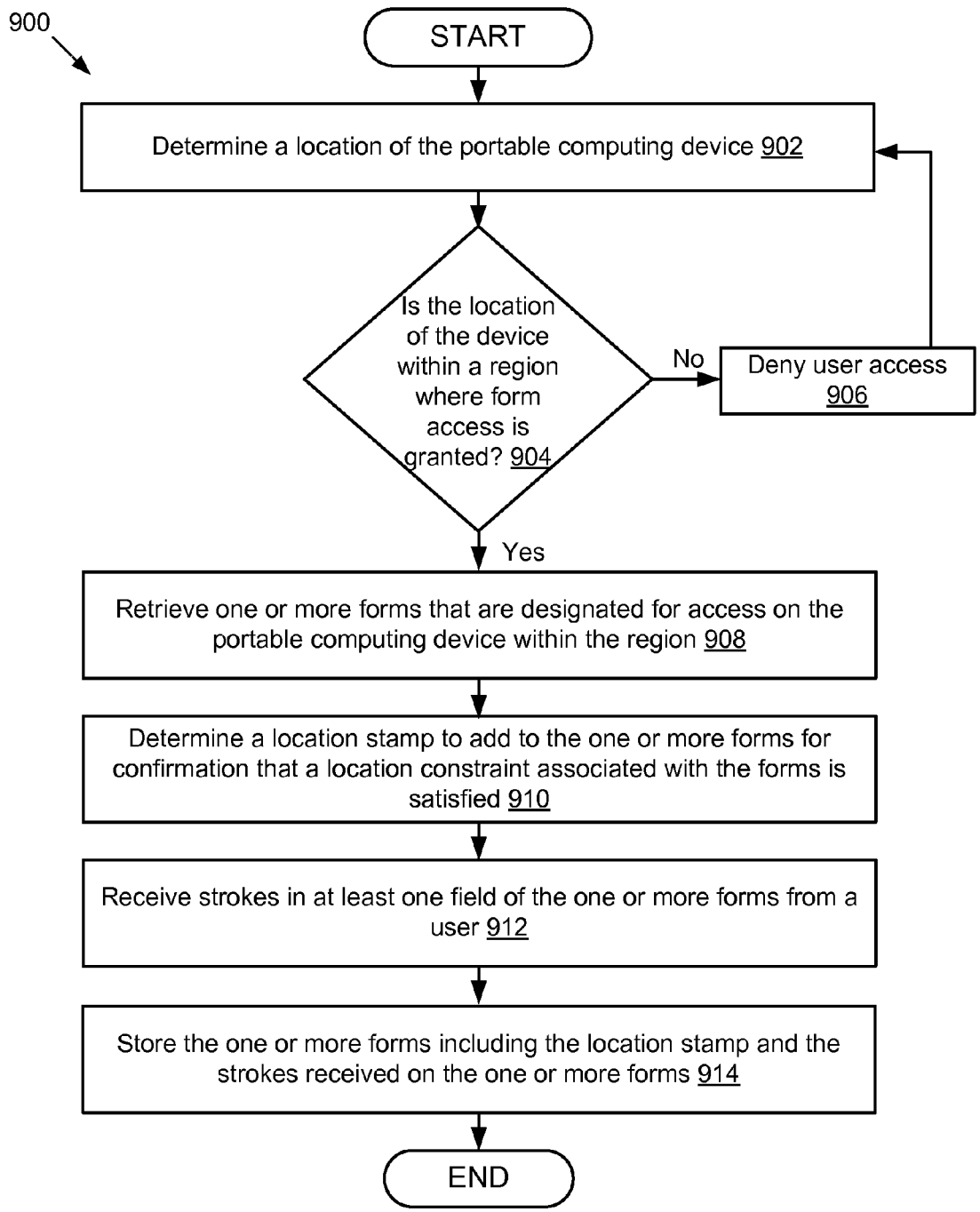
FIG. 9 is a flow diagram of another embodiment of a method for accessing one or more forms based on a location constraint.

FIG. 9 is a flow diagram 900 of another embodiment of a method for accessing one or more forms based on a location constraint. The form access module 108 includes a location detection module 206, a form access engine 208 and a stroke module 210. In one embodiment, the location detection module 206 determines 902 a location of the portable computing device 102. For example, the portable computing device 102 measures the signal intensity of wireless access points in a room or a floor and the location detection module 206 determines the tablet PC's location based on the measured signal strength. The form access engine 208 determines 904 whether the location of the portable computing device 102 is within a region where form access is granted. In some embodiments, the form access engine 208 provides access for a temporary amount of time based on the location detection module 206 confirming that the portable computing device 102 has been within the location for a specified period of time. If the location of the portable computing device 102 is not within the region where form access is granted, the form access engine 208 denies 906 user access to the form and the process begins again from step 902.

If the location of the portable computing device 102 is within the region, then the form access engine 208 retrieves 908 one or more forms that are designated for access on the portable computing device 102 within the region and determines 910 a location stamp to add to the one or more forms for confirmation that a location constraint associated with the forms is satisfied. For example, if a healthcare worker is 200 yards from the patient's house and the radial distance specified in the location constraint metadata for a health checkup form is 300 yards from the patient's house then the healthcare worker can retrieve and open the health checkup form on a tablet PC. The stroke module 210 receives 912 strokes in at least one field of the one or more forms from a user and stores 914 the one or more forms including the location stamp and the strokes received on the one or more forms.

Figure 10:
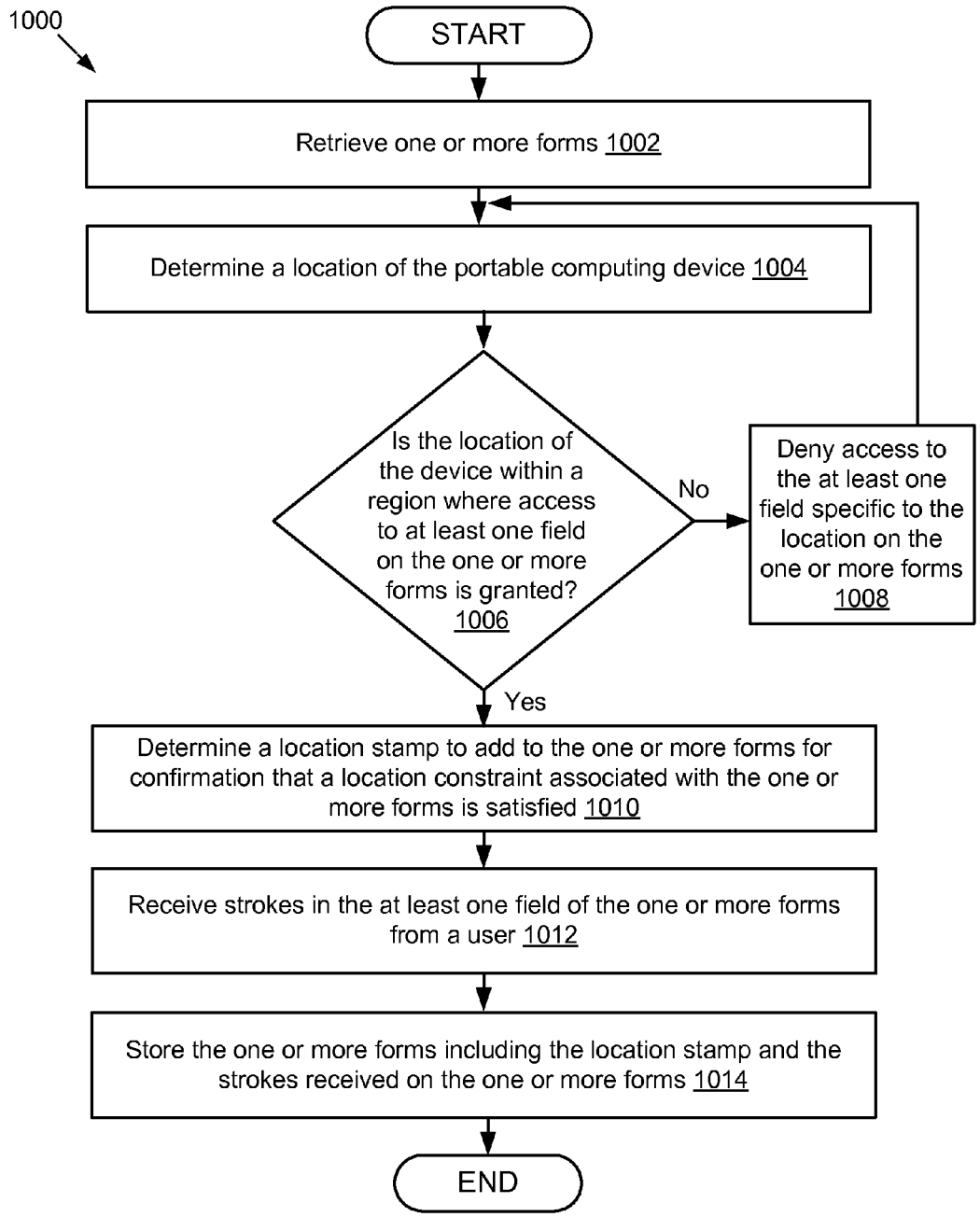
FIG. 10 is a flow diagram of one embodiment of a method for annotating strokes in at least one field based on a location constraint.

FIG. 10 is a flow diagram 1000 that illustrates one embodiment of a method for annotating strokes in at least one field based on a location constraint. The form access module 108 includes a location detection module 206, a form access engine 208 and a stroke module 210. In one embodiment, the form access engine 208 retrieves 1002 one or more forms. The location detection module 206 determines 1004 a location of the portable computing device 102. The form access engine 208 determines 1006 whether the location of the portable computing device 102 is within a region where access to at least one field on the one or more forms is granted. If the location is not within the region where access is granted, the form access engine 208 denies 1008 access to the at least one field specific to the location on the one or more forms and the process returns to step 1004.

If the location of the portable computing device 102 is within the region, then the form access engine 208 determines 1010 a location stamp to add to the one or more forms for confirmation that a location constraint associated with the one or more forms is satisfied. For example, a healthcare worker visiting a list of patients at their residence uses a single health checkup form for all the patients. If the portable computing device's 102 location matches the location constraint, the form access engine 208 removes the restriction (i.e., the form access engine 208 removes the gray shading obstructing the field) placed on adding handwriting strokes by the healthcare worker. The stroke module 210 receives 1012 strokes in the at least one field of the one or more forms from a user and stores 1014 the one or more forms including the location stamp and the strokes received on the one or more forms.

Figure 11:
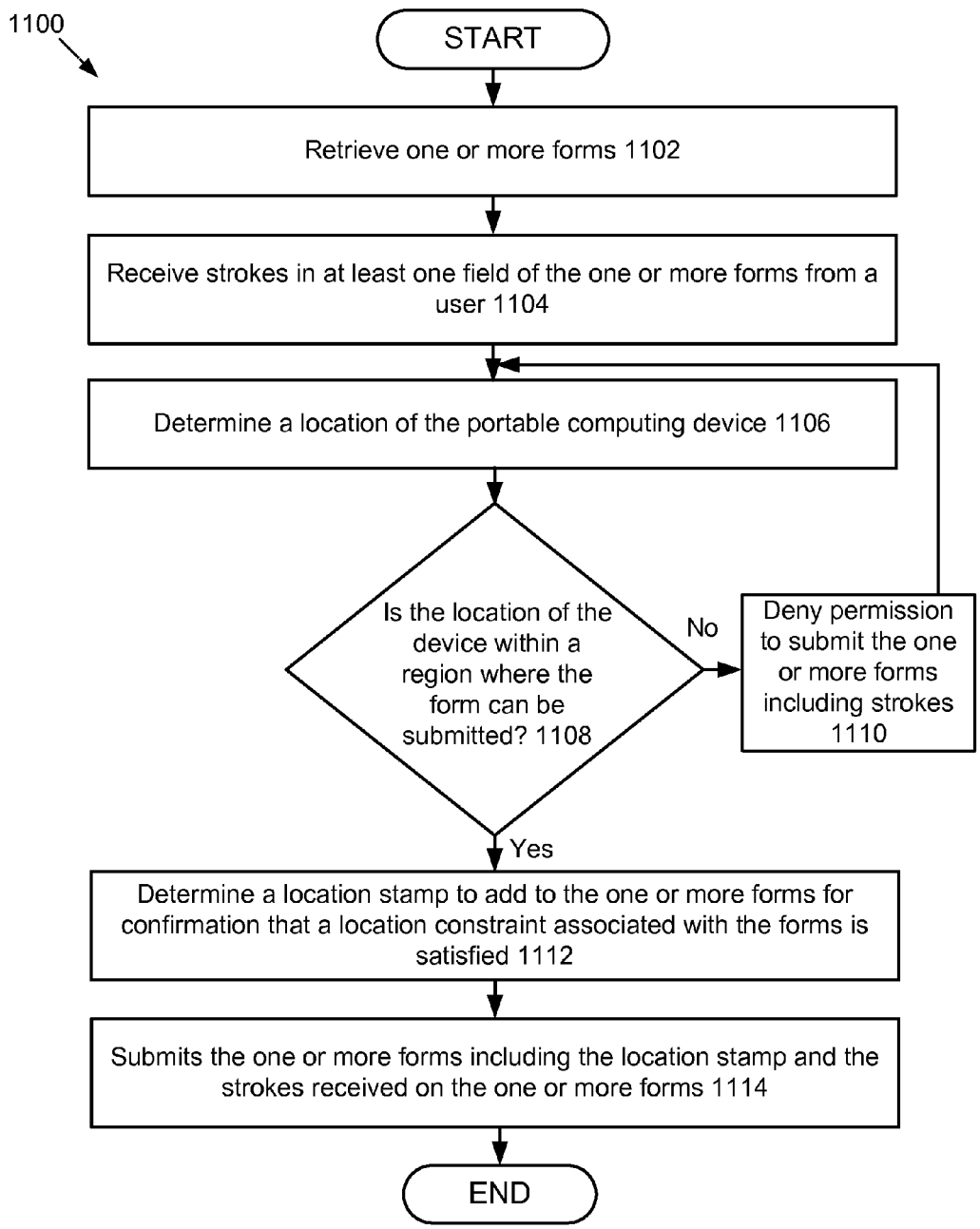
FIG. 11 is a flow diagram of one embodiment of a method for submitting the one or more forms including stroke data for submission based on a location constraint.

FIG. 11 is a flow diagram 1100 that illustrates one embodiment of a method for submitting the one or more forms including stroke data to the electronic writer server 106 for storage based on a location constraint. The form access module 108 includes a location detection module 206, a form access engine 208 and a stroke module 210. In one embodiment, the form access engine 208 retrieves 1102 one or more forms. The stroke module 210 receives 1104 strokes in at least one field of the one or more forms from a user. The location detection module 206 determines 1106 a location of the portable computing device 102. The form access engine 208 determines 1108 whether the location of the portable computing device 102 is within a region where the form can be submitted. If the location of the portable computing device 102 is not within the region, then the form access engine 208 denies 1110 permission to submit the one or more forms including strokes received on the one or more forms.

If the location of the portable computing device 102 is within the region, then the form access engine 208 determines 1112 a location stamp to add to the one or more forms for confirmation that a location constraint associated with the forms is satisfied. The stroke module 210 submits 1114 the one or more forms including the location stamp and the strokes received on the one or more forms. Submission can include storing the form in data storage 250 where the form access module 108 is on the electronic writer server 106 or submission to software for processing forms. If the form access module is on the portable computing device 102, the communication unit 255 submits the form to the electronic writer server 106 over the network 104.

For example, a safety inspector inspecting several facilities (e.g., furnace, turbine room, etc.) on a power plant uses different forms for inspection for each type of facility. The form access engine 208 compares whether the location of the safety inspector's tablet PC matches the location constraint in an inspection form for each facility. If the tablet PC's location matches the location constraint, the form access engine 208 accepts the completed form data including handwriting strokes for submission to the electronic writer server 106 or for storage in the data storage 250.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
retrieving one or more forms having a location constraint on a portable computing device;
determining a location of the portable computing device;
determining whether the location of the portable computing device is within a region where form access is granted to a first user;
responsive to determining that the location of the portable computing device is within the region where form access is granted to the first user, granting access to the one or more forms and adding a location stamp to the one or more forms, the location stamp confirming that the location constraint associated with the one or more forms is satisfied by the location of the portable computing device; and
receiving handwriting strokes from the first user in at least one field on the one or more forms.

2. The method of claim 1, further comprising:
responsive to a failure to determine that the location of the portable computing device is within the region where form access is granted to the first user, denying access to the one or more forms.

3. The method of claim 1 further comprising:
responsive to a failure to determine that the location of the portable computing device is within the region where form access is granted to the first user, rejecting strokes received from the first user in at least one field on the one or more forms.

4. The method of claim 1 further comprising:
responsive to a failure to determine that the location of the portable computing device is within the region where form access is granted to the first user, denying submission of the one or more forms and the strokes received on the one or more forms.

5. The method of claim 1 further comprising:
responsive to a failure to determine that the location of the portable computing device is within the region where form access is granted to the first user, providing a notification indicating a wrong location and a geographical map indicating a correct location to reach for form access by the first user.

6. The method of claim 1 further comprising submitting the one or more forms for processing.

7. The method of claim 1 wherein determining whether the location of the portable computing device is within the region where form access is granted comprises determining whether the location detected for the portable computing device is less than a radial distance from a center of a constrained location as specified by the location constraint in a location constraint metadata associated with the one or more forms.

8. The method of claim 1 wherein determining whether the location of the portable computing device is within the region where form access is granted comprises determining whether the location detected for the portable computing device is within a polygon traced by a closed chain of geographical coordinates as specified in a location constraint metadata associated with the one or more forms.

9. The method of claim 1, further comprising:
receiving annotations from a second user for the location constraint on a geographical map;
adding the location constraint to the one or more forms;
adding the location constraint to the at least one field in the one or more forms; and
storing the location constraint as a metadata associated with the one or more forms.

10. The method of claim 1, further comprising:
responsive to a failure to determine that the location of the portable computing device is within the region where form access is granted to the first user, periodically checking whether the location of the portable computing device is within the region where form access is granted to the first user and, if so, providing access to the form.

11. The method of claim 10, wherein access is revoked if the portable computing device moves outside of the region where form access is granted to the first user.

12. A system comprising:
a processor;

a form access engine stored on the memory and executable by the processor, the form access engine coupled to the location detection module and configured to retrieve one or more forms on a portable computing device, to determine whether a location of the portable computing device is within a region where form access is granted to a first user, and responsive to determining that the location of the portable computing device is within the region where form access is granted to the first user, to grant access to the one or more forms and to add a location stamp to the one or more forms, the location stamp confirming that the location constraint associated with the one or more forms is satisfied by the location of the portable computing device;

a location detection module stored on a memory and executable by the processor, the location detection module configured to determine the location of the portable computing device; and a stroke module stored on the memory and executable by the processor, the stroke module coupled to the form access engine and configured to receive handwriting strokes from the first user in at least one field on the one or more forms.

13. The system of claim 12,
wherein the form access engine responsive to a failure in determining that the location of the portable computing device is within the region where form access is granted to the first user, is configured to deny access to the one or more forms.

14. The system of claim 12,
wherein the form access engine responsive to a failure in determining that the location of the portable computing device is within the region where form access is granted to the first user, is configured to reject strokes received from the first user in at least one field on the one or more forms.

15. The system of claim 12,
wherein the form access engine responsive to a failure in determining that the location of the portable computing device is within the region where form access is granted to the first user, is configured to deny submission of the one or more forms and the strokes received on the one or more forms.

16. The system of claim 12, further comprising:
a user interface engine stored on the memory and executable by the processor, the user interface engine coupled to the form access engine and configured to provide a notification indicating a wrong location and a geographical map indicating a correct location to reach for form access by the first user responsive to a failure in determining that the location of the portable computing device is within the region where form access is granted to the first user.

17. The system of claim 12, wherein the stroke module is further configured to submit the one or more forms for processing.

18. The system of claim 12 wherein the form access engine determines whether the location of the portable computing device is within the region where form access is granted by determining whether the location detected for the portable computing device is less than a radial distance from a center of a constrained location as specified by the location constraint in a location constraint metadata associated with the one or more forms.

19. The system of claim 12 wherein the form access engine determines whether the location of the portable computing device is within the region where form access is granted by determining whether the location detected for the portable computing device is within a polygon traced by a closed chain of geographical coordinates as specified in a location constraint metadata associated with the one or more forms.

20. A computer program product comprising a non-transitory medium including a computer readable program, wherein the computer readable program when executed on a computer causes the computer to:

retrieve one or more forms having a location constraint on a portable computing device; determine a location of the portable computing device; determine whether the location of the portable computing device is within a region where form access is granted to a user;

responsive to determining that the location of the portable computing device is within the region where form access is granted to the user, grant access to the one or more forms and add a location stamp to the one or more forms, the location stamp confirming that the location constraint associated with the one or more forms is satisfied by the location of the portable computing device; and receive handwriting strokes from the user in at least one field on the one or more forms.

* * * * *